(12) United States Patent
Kron et al.

(10) Patent No.: US 6,534,187 B2
(45) Date of Patent: Mar. 18, 2003

(54) COATING MATERIAL AND PROCESS FOR THE PRODUCTION OF FUNCTIONAL COATINGS

(75) Inventors: Johanna Kron, Zell (DE); Gerhard Schottner, Heilsbronn (DE); Klaus Greiwe, Wuerzburg (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/843,628

(22) Filed: Apr. 27, 2001

(65) Prior Publication Data

US 2002/0018900 A1 Feb. 14, 2002

Related U.S. Application Data

(63) Continuation-in-part of application No. 08/539,270, filed on Oct. 4, 1995, now abandoned, which is a continuation of application No. 08/187,093, filed on Jan. 26, 1994, now abandoned.

(30) Foreign Application Priority Data

Feb. 8, 1993 (DE) .......................................... 43 03 570

(51) Int. Cl.$^7$ .............................................. B32B 25/20
(52) U.S. Cl. ........................... 428/447; 528/33; 528/25; 528/12; 524/430; 106/287.16; 106/287.12; 106/287.17; 525/474; 427/493
(58) Field of Search ............................... 528/33, 25, 12; 524/430; 106/287.16, 287.12, 287.17; 525/474; 428/447; 427/493

(56) References Cited

U.S. PATENT DOCUMENTS 6,051,665 A * 4/2000 Yamada et al.

FOREIGN PATENT DOCUMENTS

DE 3836815 * 7/1990

* cited by examiner

Primary Examiner—Margaret G. Moore
Assistant Examiner—Kuo Liang Peng
(74) Attorney, Agent, or Firm—Marshall & Melhorn, LLC

(57) ABSTRACT

The invention relates to a process for producing functional coatings with organofunctional silanes, a metal compound and difficultly volatile oxides, in which a) a hydrolytic condensation is performed, optionally in the presence of a condensation catalyst and/or additives, of the following components
1. at least one crosslinkable organofunctional silane,
2. at least one metal compound,
3. optionally at least one non-crosslinkable organofunctional silane and
4. optionally one or more difficultly volatile oxides soluble in the reaction medium;

b) that to said hydrolytic condensate is added an organic, crosslinkable prepolymer; and c) the thus obtained coating solution is applied to a substrate and subsequently cured.

19 Claims, No Drawings

COATING MATERIAL AND PROCESS FOR THE PRODUCTION OF FUNCTIONAL COATINGS

CROSS REFERENCE TO RELATED APPLICATIONS

This application is a continuation-in-part application of U.S. patent application Ser. No. 08/539,270, filed on Oct. 4, 1995, now abandoned, which is a continuation of U.S. patent application Ser. No. 08/187,093, filed on Jan. 26, 1994, now abandoned. U.S. patent application Ser. No. 08/539,270 was pending as of the filing date of the present application. U.S. patent application Ser. No. 08/187,093, was pending as of the filing date of U.S. patent application Ser. No. 08/539,270.

BACKGROUND OF THE INVENTION

1. Field of the Invention

The invention relates to a process for the production of functional coatings of organofunctional silanes and a coating material for producing coated substrates.

2. Description of the Prior Art

Thermally curable coating materials for plastic surfaces based on polysiloxane, which lead to improved mechanical characteristics such as scratch resistance and abrasion resistance, have already been used commercially for a considerable time (cf. J. Hennig "Kratzfest beschichtete Kunststoffe" in Kunststoffe 71, 1981, p.103). However, the use of the coating materials described therein is partly limited by the low thermal stability of organic polymeric materials, so that for thermally less stressable thermoplastics, such as e.g. ABS, PS PVC, PUR, PE, PP, etc., UV-curable coating materials have been developed (cf. K. Greiwe in "Better Ceramics through chemistry V" published by M. J. Hampden-Smith, W. G. Klemperer and C. J. Brinker, "Characterisation of hydrolysed Alkoxysilanes and Zirconiumalkoxides for the development of UV-curable scratch-resistant coatings" in Mat. Res. Soc. Symp. Proc. Vol. 271, 1992, p.725). These polysiloxane-based, UV-curable materials are completely suitable for the above-indicated plastics in certain use cases as a result of their faster curing and lower thermal stressing, but fail to completely cover the use range of polysiloxane-based functional protective coatings.

DE 4,025,215 describes an alkali-stable and abrasion-resistant polysiloxane-based coating. The material is obtained by reacting organic epoxides with aminofunctional alkoxy silanes. However, the coating material only has a limited pot life and must therefore be used relatively quickly following its manufacture. DE 3,828,098 A1 describes a lacquer and a process for the production of scratch-proof coatings. Although this process leads to coatings, which offer satisfactory results with respect to numerous characteristics (e.g. scratch resistance, transparency, good primary adhesion to substrates), improvements are necessary to such coatings for numerous applications.

The main disadvantages of these systems are the lack of permanent adhesion of the thus produced coatings to substrates, as well as an inadequate pot life of the lacquers.

In the case of different corrosive stresses (particularly in alkaline aqueous solutions), the adhesion of such coatings deteriorates down to the complete detachment of the coating and consequently the protection (e.g. abrasion and corrosion protection) for the particular substrate is no longer guaranteed. The lacquers according to DE 3,828,098 A1 have such a short pot life that, if the described good characteristics are to be obtained, must be processed within a few hours (max. 8 h) and must therefore be directly produced in situ.

The problem of the present invention, based on DE 3,828,098, is to provide a coating material and a process for the production of functional coatings on substrates, which compared with the known coating materials has a permanent adhesion even under unfavourable corrosive conditions, whereby simultaneously good stratch and abrasion resistances are required. In addition, the coating material must have an increased pot life, so that it can be processed over a longer period of time extending to several weeks.

SUMMARY OF THE INVENTION

With respect to the process, this problem is solved, for example, by a process for the production of abrasion resistant functional coatings utilizing organofunctional silanes, a metal compound and difficultly volatile oxides, comprising the steps of:

a) performing a hydrolytic condensation, optionally in the presence of a condensation catalyst and/or additives, of the following components 1) at least one crosslinkable, organofunctional silane of formula (II)

$$R'''_m SiX_{(4-m)} \quad \text{(II)}$$

in which the groups X, being the same or different, stand for hydrogen, halogen, alkoxy, acyloxy, alkylcarbonyl, alkoxycarbonyl or —NR''$_2$ (R''=H and/or alkyl) and the radicals R''', being the same or different, stand for alkyl, alkenyl, alkynyl, aryl, arylalkyl, alkylaryl, arylalkenyl, alkenylaryl, arylalkynyl or alkynylaryl, in which the R''' radicals can be interrupted by O or S-atoms or the group —NR'', the R''' radicals can carry one or more substituents from the group of halogens and optionally substituted amino, amide, aldehyde, keto, alkylcarbonyl, carboxy, mercapto, cyano, hydroxy, alkoxy, alkoxycarbonyl, sulphonic group, phosphoric group, acryloxy, methacryloxy, epoxy or vinyl groups and m has the value 1,2 or 3 and/or an oligomer derived therefrom, in which the radical R''' and/or the substituent is a crosslinkable radical or substituent, in a quantity of 10 to 95 mole %, based on the total number of moles of the monomeric starting component;

2) at least one metal compound of general formula III

$$MeR_y \quad \text{(III)}$$

in which Me is a metal selected from Al, Zr, or Ti, in which y in the case of Al aluminium is 3 and zirconium and titanium is 4 and the radicals R, which can be the same or different, stand for halogen, alkyl, alkoxy, acyloxy or hydroxy, in which said groups can be wholly or partly replaced by chelating ligands or an oligomer derived therefrom or an optionally complexed metal salt of an inorganic or organic acid, in a quantity of 5 to 75 mole %, based on the total number of moles of the monomeric starting component;

3) optionally at least one non-crosslinkable organofunctional silane of formula I

$$R'_m SiX_{(4-m)} \quad \text{(I)}$$

in which the groups X, which can be the same or different, stand for hydrogen, halogen, hydroxy, alkoxy, acyloxy, alkylcarbonyl, alkoxycarbonyl or —NR"$_2$(R"=H and/or alkyl) and the radicals R', which can be the same or different, stand for alkyl, aryl, arylalkyl or alkylaryl, in which said R' radicals can be interrupted by O or S-atoms or the group —NR", the R' radicals also can carry one or more substituents from the group of halogens and optionally substituted amide, aldehyde, keto, alkylcarbonyl, carboxy, cyano, alkoxy or alkoxycarbonyl groups and m has the value 1,2 or 3 and/or an oligomer derived therefrom, in a quantity of 0 to 60 mole %, based on the total number of moles of the monomeric starting components; and 4) optionally one or more difficultly volatile oxides, soluble in the reaction medium, of an element of the main group Ia to Va or the auxiliary groups IIb, IIIb, Vb to VIIb of the periodic system, with the exception of Al, and/or one or more compounds of one of these elements soluble in the reaction medium and forming a difficultly volatile oxide under the reaction conditions, in a quantity of 0 to 70 mole %, based on the total number of moles of the monomeric starting component;

b) adding to said hydrolytic condensate an organic, crosslinkable prepolymer, said crosslinkable prepolymer being completely an unblocked prepolymer, the reacting, crosslinkable groups of radical R'" or the crosslinkable substituent at the radical R'" being crosslinkable with identical reaction groups at the prepolymer and the prepolymer is added in a quantity of 2 to 70 mole %, based on the total number of moles of the monomeric starting component, thereby resulting in a coating solution; and c) applying and subsequently curing the coating solution on a substrate. Advantageous further developments are described herein.

It is essential to the invention that through the use of the crosslinkable, organic silane of general formula II (component 1) in conjunction with the crosslinkable prepolymer, an additional, organic crosslinking occurs. It has surprisingly been found that the latter crosslinking is responsible for obtaining an excellent permanent adhesion, even when there is simultaneously a corrosive action. At the same time a greatly extended pot life is obtained. According to the preferred embodiment of claim 2, it is particularly advantageous if the metal compound of general formula III (component 2) is used in chelated form. This further increases the pot life. As a result of this measure the coating material can be processed for several weeks.

DETAILED DESCRIPTION OF THE PREFERRED EMBODIMENT

According to a preferred embodiment, it is advantageous if the viscosity of the coating material is adjusted to a value of 5 to 50 mPa·s. Thus, it is decisive in the present substrate coating process, that the organofunctional silane of general formula II is crosslinked by an additional organic crosslinking with the aid of a purely organically crosslinkable prepolymer. Both the radical R'" and the corresponding substituent of the organofunctional silane of general formula II are responsible for said crosslinking. Therefore the crosslinking can start from the radical R'" or the substituent of the radical R'". However, preferably the crosslinking starts from the substituent.

The groups X in the general formulas I and II, which can be the same or different, can be hydrogen, halogen, alkoxy, acyloxy, alkylcarbonyl, alkoxycarbonyl or NR"$_2$, in which R" is hydrogen or alkyl.

The non-crosslinkable radicals R', which can be the same or different, are either alkyl, aryl, arylalkyl or alkylaryl. These radicals can be interrupted by O or S-atoms or the NR" group and carry one or more non-crosslinkable substituents from the group of halogens and the optionally substituted amide, aldehyde, keto, alkylcarbonyl, carboxy, cyano, alkoxy or alkoxycarbonyl groups. Alkyl radicals are e.g. straight-chain, branched or cyclic radicals with 1 to 20 preferably I to 10 carbon atoms and in particular lower alkyl radicals with 1 to 6 and preferably 1 to 4 carbon atoms. Specific examples are methyl, ethyl, n-propyl, isopropyl, n-butyl, sec.-butyl, tert.-butyl, isobutyl, n-pentyl, n-hexyl, dodecyl, octadecyl and cyclohexyl.

Preferably, in the silanes of general formula I, the index m=1. In the case of higher values of m, there is a risk of a reduction in the hardness of the material, if too much such silane is used.

Specific examples for the organofunctional silanes of formula I are: bis-(dimethylamino)-methyl, phenyl silanes, bis-(mono-n-butylamino)-dimethyl silanes, 2-chloroethyl trichloro silanes, 2-chloroethyl methyl dichloro silanes, di-n-butyl dichloro silanes, diethyl diethoxy silanes, ethyl trimethoxy silanes, 8-bromooctyl trichloro silanes, 3-bromopropyl trichloro silanes, t-butyl-trichloro silanes, 1-chloroethyl trichloro silanes, chloromethyl trichloro silanes, chlorophenyl trichloro silanes, cyclohexyl trichloro silanes, dimethyl dichloro silanes, diphenyl dichloro silanes, ethyl dichloro silanes. Particular preference is given to phenyl trimethoxy silane, aminopropyl triethoxy silane and propyl trimethoxy silane. All the silanes are commercially obtainable, e.g. from ABCR GmbH & Co., Postfach 210135, D-7500, Karlsruhe 21.

In the organofunctional silanes of general formula II (component 1), X and m have the meanings given hereinbefore. The radical R'" or the substituent must be such that it is suitable for crosslinking. The radical R'" can be: alkyl, alkenyl, alkinyl, aryl, arylalkyl, alkylaryl, arylalkenyl, alkenylaryl, arylalkinyl or alkinylaryl. These radicals can be interrupted, as in the case of the organofunctional silane of general formula I, by 0 or S-atoms or the NR" group. The radical R'" can also carry one or more crosslinkable substituents from the group of halogens and the optionally substituted amino, amide, aldehyde, keto, alkylcarbonyl, carboxy, mercapto, cyano, hydroxy, alkoxy, alkoxycarbonyl, sulphonic acid, phosphoric acid, acryloxy, methacryloxy, epoxy or vinyl groups.

Specific examples for a crosslinkable, organofunctional silane of general formula II are vinyl trimethoxy silane, aminopropyl triethoxysilane, isocyanatopropyl triethoxy silane, mercaptopropyl trimethoxy silane, vinyltriethoxy silanes, vinyl ethyl dichloro silanes, vinyl methyl diacetoxy silanes, viny methyl dichloro silanes, vinyl methyl diethoxy silanes, vinyl triacetoxy silanes, vinyl trichloro silanes, phenyl vinyl dichloro silanes, phenyl allyl dichloro silanes, 3-isocyanotopropyl triethoxy silanes, methacryloxy propenyl trimethoxy silanes and 3-methacryloxy propyl trimethoxy silanes. Particular preference is given to methacryloxy propyl trimethoxy silane and 3-glycidyloxy propyl trimethoxy silane. These and further silanes can be obtained from the same manufacturer as indicated hereinbefore.

Metal compounds usable according to the invention are in particular those with the empirical formula MeR$_y$ (III), in which the radicals R, which can be the same or different, stand for halogen, alkyl, alkoxy, acryloxy or hydroxy.

Examples of preferred metals are Al, Ti or Zr and y is then either 3 for Al or 4. Particular preference is given to Al. Preferably (claim 2) the metal compounds of general formula (III), before undergoing hydrolytic condensation, are chelated with a standard chelating ligand in the ratio 1:0.5-2. A ratio of approximately 1:1 has proved advantageous. The chelating ligand can be any standard chelating ligand, particularly acetyl acetone or ethyl acetoacetate.

Specific examples for metal compounds usable according to the invention are e.g. disclosed in DE 3,828,098 or 3,407,087, which are then chelated with the corresponding chelating ligands.

In place of the monomeric starting silanes, it is optionally possible to also use precondensed oligomers of said silanes, which are soluble in the reaction medium, i.e. straight-chain or cyclic, low molecular weight partial condensates (polyorganosiloxanes) with a degree of condensation of e.g. approximately 2 to 100, particularly approximately 2 to 6. The same applies with respect to the metal component (III). It is also possible to use fluorinated silanes, as described in EP 358,011 A2.

As the fourth component, the reaction medium can optionally contain soluble, difficultly volatile oxides or, compounds forming such difficultly volatile oxides of elements of the main group Ia to Va or their auxiliary groups IIb, IIIb, Vb to VIIIb of the periodic system of elements, with the exception of aluminium. Among the difficultly volatile oxides particular preference is given to $B_2O_3$, $P_2O_5$ and $SnO_2$.

For crosslinking purposes use is made of prepolymers, in which the reacting, crosslinkable groups of the radical R''' and/or the crosslinkable substituents at the radical R''' can be crosslinked with the reacting groups at the prepolymer and these preferably include "like" prepolymers.

According to the invention the term like, crosslinkable prepolymers are understood to mean those in which the reacting groups are identical. In the case of epoxy group-containing silanes, use is made of epoxy resin, whilst in the case of acrylic group-containing silanes use is made of acrylates and generally acrylates are used in the case of acryloxy group-containing radicals. In the case of vinyl radicals or radicals with other polymerizable double bonds, prepolymers with crosslinkable double bonds are used.

The invention also covers the following crosslinking possibilities:

mercapto group-containing silanes and prepolymers with crosslinkable double bonds,
isocyanate group-containing silanes and polyols,
hydroxy group-containing silanes and isocyanates,
amino group-containing silanes and epoxy resins.

In part, mixtures of epoxy group-containing silanes and epoxy resins also contain silanes with aminoalkyl radicals. Here the amino group can crosslink both with the epoxy unit at the silane and with the epoxy resin.

For producing the coating the organofunctional silanes of general formula II and optionally I are stirred under ice cooling. Following this the metal compound of general formula III is chelated or a chelating ligand is added and then hydrolytic condensation takes place. To the reaction mixture is then added a prepolymer crosslinkable with the radical R'''. Preferably the viscosity of the mixture is set to the desired value using conventional lacquer solvents. The thus obtained mixture is then applied to a substrate and cured.

For the production of the coating according to the invention, it is preferable to use 10 to 95, particularly 20 to 90 and with particular preference 30 to 90 mole % of component 1, 5 to 75, particularly 5 to 60 and in particularly preferred manner 10 to 40 mole % of component 2 and 0 to 60, particularly 0 to 50 and in particularly preferred manner 0 to 40 mole % of component 3 and max. 0 to 70 and preferably max. 0 to 40 mole % of component 4.

Component 1, in accordance with claim 1, is the crosslinkable silane of general formula II, component 2 the metal compound of formula III and component 3 the non-crosslinkable silane of general formula I.

It is particularly advantageous (claim 3), if hydrolytic condensation is performed in such a way that there is a hydrolytic precondensation with a lower water quantity than the quantity stoichiometrically required for complete hydrolysis of the hydrolyzable groups and then the prepolymer is added and subsequently further condensation takes place by adding further water, which partly or wholly brings about the hydrolysis of the remaining hydrolyzable groups.

Preferably precondensation takes place in the presence of a condensation catalyst. With respect to the performance of the process by means of precondensation, reference is made to DE-OS 3,828,098. The present invention also includes all condensation catalysts of the aforementioned document.

The processing of the coating material can now take place either immediately or only after a few weeks. As a result of the preferred inventive use of the chelated metal compound, it is possible to keep the coating material processable over a period of several weeks. Coating can then take place using all prior art processes, such as dipping, flow coating, pouring, centrifuging, spraying, rolling or brushing on. The substrates for the coating can be random materials such as e.g. metals, plastics, ceramics, glass, paper or wood. The coating can be applied in different layers of e.g. I to 100 or preferably 2 to 30 $\mu$m. It is preferable (claim 10) for the hardened coating to be subsequently treated chemically and/or physically, preferably with laser (UV) radiation.

The invention also relates to the substrates coated by the process according to the invention. According to the invention, for this purpose substrates are coated using the above-described process.

The invention also relates to a coating material for producing coatings on substrates. According to the characterizing features of claim 12 from the above-described organofunctional silanes a hydrolytic condensate is produced and then in a second stage to said hydrolytic condensate is added an organic, crosslinkable prepolymer of the corresponding radical R'''. As in the process, it is again preferable for the hydrolytic condensation to be performed firstly as a hydrolytic precondensation of components 1 to 4 with a smaller water quantity than that necessary for complete hydrolysis, followed by the addition of the prepolymer and further condensation.

The coating material can contain conventional additives (claim 15) and condensation catalysts. With regards to the conventional additives it is preferable to use organic thinners, flow-control agents, colouring agents, UV-stabilizers, fillers, viscosity regulators, lubricants, spreading agents, sedimentation inhibitors, oxidation inhibitors or mixtures of these substances. Preferably in the case of the preferred embodiment according to claim 3, precondensation takes place in the presence of dcondensation catalyst. The condensation catalyst can be in the form of amines and compounds splitting off hydroxyl ions or protons. The invention also incorporates the condensation catalysts disclosed in DE-OS 3,828,098. According to claim 17 it is advantageous to set the viscosity at 0 to 50 and in particular to approximately 15 mPa·s.

With the coating material according to the invention or with the inventive process for producing coated substrates, coatings on substrates are obtained which, besides high scratch and abrasion resistance and excellent adhesion to different substrates (particularly glass and different metals) are in particular characterized by permanent adhesion (following various weather resistance tests) and good stability with respect to alkaline solutions. The characteristics of the coated material are maintained, even if it is only applied after a certain storage time (several weeks). As the viscosity of the coating material only rises very slowly (from approximately 12 to approximately 17 mPa·s after storing for 6 weeks), even after 6 weeks storage, it is possible to obtain coatings having excellent characteristics.

In addition, the coating material can be very adequately coloured using known dyes and can be processed to screen printable pastes by adding aerosils and optionally paint pigments (as a function of requirements).

Dyes soluble in alcoholic-aqueous solutions are particularly preferred. Such dyes are e.g. commercially available from Ciba-Geigy under the name Orasol dyes.

Preferably the coating material is also suitable for the application of a barrier layer with respect to $H_2S$.

A preferred embodiment of the present invention discloses a process for the production of abrasion resistant functional coatings utilizing organofunctional silanes, a metal compound and difficultly volatile oxides. The process includes the following steps:

a) performing a hydrolytic condensation, optionally in the presence of a condensation catalyst and/or additives, of the following components 1) at least one crosslinkable, organofunctional silane of formula (II)

$$R'''_m SiX_{(4-m)} \quad (II)$$

in which the groups X, being the same or different, stand for hydrogen, halogen, alkoxy, acyloxy, alkylcarbonyl, alkoxycarbonyl or —NR"$_2$(R"=H and/or alkyl) and the radicals R''', being the same or different, stand for alkyl, alkenyl, alkynyl, aryl, arylalkyl, alkylaryl, arylalkenyl, alkenylaryl, arylalkynyl or alkynylaryl, in which the R''' radicals can be interrupted by O or S-atoms or the group —NR", the R''' radicals can carry one or more substituents from the group of halogens and optionally substituted amino, amide, aldehyde, keto, alkylcarbonyl, carboxy, mercapto, cyano, hydroxy, alkoxy, alkoxycarbonyl, sulphonic group, phosphoric group, acryloxy, methacryloxy, epoxy or vinyl groups and m has the value 1,2 or 3 and/or an oligomer derived therefrom, in which the radical R''' and/or the substituent is a crosslinkable radical or substituent, in a quantity of 10 to 95 mole %, based on the total number of moles of the monomeric starting component;

2) at least one metal compound of general formula III $$MeR_y \quad (III)$$

in which Me is a metal selected from Al, Zr, or Ti, in which y in the case of Al aluminium is 3 and zirconium and titanium is 4 and the radicals R, being the same or different, stand for halogen, alkyl, alkoxy, acyloxy or hydroxy, in which said groups can be wholly or partly replaced by chelating ligands or an oligomer derived therefrom or an optionally complexed metal salt of an inorganic or organic acid, in a quantity of 5 to 75 mole %, based on the total number of moles of the monomeric starting component;

3) optionally at least one non-crosslinkable organofunctional silane of formula I

$$R'_m SiX_{(4-m)} \quad (I)$$

in which the groups X, which can be the same or different, stand for hydrogen, halogen, hydroxy, alkoxy, acyloxy, alkylcarbonyl, alkoxycarbonyl or —NR"$_2$(R"=H and/or alkyl) and the radicals R', being the same or different, stand for alkyl, aryl, arylalkyl or alkylaryl, in which said R' radicals can be interrupted by O or S-atoms or the group —NR", the R' radicals also can carry one or more substituents from the group of halogens and optionally substituted amide, aldehyde, keto, alkylcarbonyl, carboxy, cyano, alkoxy or alkoxycarbonyl groups and m has the value 1,2 or 3 and/or an oligomer derived therefrom, in a quantity of 0 to 60 mole %, based on the total number of moles of the monomeric starting components; and 4) optionally one or more difficultly volatile oxides, soluble in the reaction medium, of an element of the main group Ia to Va or the auxiliary groups IIb, IIIb, Vb to VIIIb of the periodic system, with the exception of Al, and/or one or more compounds of one of these elements soluble in the reaction medium and forming a difficultly volatile oxide under the reaction conditions, in a quantity of 0 to 70 mole %, based on the total number of moles of the monomeric starting component;

b) adding to said hydrolytic condensate an organic, crosslinkable prepolymer, said crosslinkable prepolymer being completely an unblocked prepolymer, the reacting, crosslinkable groups of radical R''' or the crosslinkable substituent at the radical R''' being crosslinkable with identical reaction groups at the prepolymer and the prepolymer is added in a quantity of 2 to 70 mole %, based on the total number of moles of the monomeric starting component, thereby resulting in a coating solution; and c) applying and subsequently curing the coating solution on a substrate.

The process described above is a preferred process for carrying out the invention. It is preferred that the organic crosslinkable prepolymer be completely unblocked. It is also preferred that the reacting crosslinkable groups of radical R''' and/or the crosslinkable substituent at the radical R''' are identical to and crosslinkable with those at the prepolymer. Also preferred are coatings made from the process as described above, or equivalent processes.

The following examples serve to illustrate the invention.

EXAMPLE 1

59.5g of phenyl trimethoxy silane, 460.1 g of glycidyloxy propyl trimethoxy silane and 26.9 g of aminopropyl triethoxy silane are brought together and stirred under ice cooling. 147.8 g of aluminium sec. butylate are mixed with 78.1 g of ethyl acetoacetate and slowly added to the reaction solution. Accompanied by stirring and whilst maintaining ice cooling 182.3 g of water are carefully and slowly added. At the end of hydrolysis 88.6 g of epoxy resin D.E.R. 330 (Dow Corning Company) are stirred into the hydrolyzate.

For adjusting the lacquer characteristics it is possible to add at this time conventional lacquer additives and solvents (high boiling alcohols and glycol ethers).

The reaction solution can also be applied by conventional processes to different substrates. If the coating material is applied to cleaned brass fittings by spraying, then after curing (2 hours at 160° C.) colourless, transparent coatings are obtained, which are characterized by good adhesion and abrasion resistance characteristics.

Results a) after 130 hours salt-spray test (DIN 50 021): no corrosion damage on the surface,
b) after 3 cycles of the $SO_2$ test (Kesternich test) individual corrosion spots on the surface, which are more pronounced in the vicinity of the grid,
c) after 200 hours condensing humidity test (DIN 50 017): Gt 0,
d) after 24 hours hand sweat dewing (based on ISO 4538-1978 (E)): individual, but very few corrosion spots on the surface.

For testing the barrier action with respect to $H_2O$ in connection with this coating material, a tarnishing test for silver-plated articles was also performed.

Tarnishing Test for Silver-plated Articles

Gassing in the "tarnishing box", volume of box: 380 l (55×80×90 cm) with air circulation by fan.

Performance of the tarnishing test: placing a 2 liter beaker with 0.2 ml of ammonium polysulphide solution in 2 liters of deionized water on the bottom of the tarnishing box.

Evaluation of the tarnishing behaviour: 1 hour—several days, compared with clean silver surfaces.

Compared with the coatings produced in DE 3,828,098, the results obtained with the coating material according to the invention are clearly superior, both with regards to hand sweat dewing and the pot life. The good barrier action against $H_2S$ must also be stressed.

Testing Methods Used

The coatings were evaluated with the following testing methods for their hardness, abrasion resistance, adhesion and storage stability under moist climatic conditions:

Determination of the Abrasion Resistance (DIN 52347)

This abrasion test using the friction wheel method was carried out to test the behaviour of glass and transparent plastic with respect to sliding abrasion. The test was performed on planar surfaces. The increase in the scattered light was the test quantity. The testpiece, lying on the turntable of the abrasion testing apparatus, was subject to sliding abrasion by the action of two friction wheels rotating in opposite directions (100 cycles). The friction wheels were made from a clearly defined, fine-grain abrasive ($Al_2O_3$) embedded in rubber. The measurement quantity for the abrasion was the increase in the scattering of the transmitted light, resulting from the surface change during the abrasion test. It is to be measured as the degree of scattered transmission $T_d$ or as turbidity $T_d$.

Evaluating the Adhesion to the Substrate

The adhesion of coatings to the substrate was tested according to three different methods:

a) Tesa film abrasion test for testing the marginal adhesion. A strip of a commercially available Tesa film (Tesafix 6996) was applied to the edge of the CD at an undamaged point of the lacquer film, firmly pressed in air bubble-free manner and then tugged off under an angle of 90°. Both the Tesa strip and also the thus treated lacquer surface were tested for the presence of tugged off coating material. The test can be repeated for a random number of times (up to 20) using new Tesa film at the same point of the coated substrate.
b) Grid test (DIN 53151) The grid test is a simple empirical test for evaluating the adhesion of lacquers to the substrate. It is also possible to evaluate the brittleness and other strength characteristics of the lacquer. This is carried out by means of a multiple cutter which makes a cut pattern with 6 cuts passing through to the substrate, which leads to a grid having 25 squares. By examining the squares under a microscope and comparing them with reference images grid characteristics from Gt 0 (very good adhesion) to Gt 5 (very poor adhesion) are obtained.
c) Tape Test (ASTM D 3359) This test corresponds to DIN 53151. For evaluating the cut pattern, use is made of a strip of commercially available Tesa film which is applied to the cut point and rapidly pulled off under an angle of 90°. The subsequent evaluation takes place according to the aforementioned principle.

Condensing Humidity Test (DIN 50017)

The coated testpiece was stored for 14 days in a heating cabinet at 40° C. and with high atmospheric humidity. The adhesion was then evaluated and the scratch hardness determined. If the values found are in the same range (the grid characteristic must decrease by at the most one unit), the test is considered to have been successfully completed.

EXAMPLE 2

5.9 g of phenyl trimethoxy silane, 48.4 g of glycidyloxypropyl trimethoxy silane and 2.7 g of aminopropyl triethoxy silane are brought together and stirred under ice cooling. 14.8 g of aluminium. sec. butylate are mixed with 7.8 g of ethyl acetoacetate and slowly added to the reaction solution. Accompanied by stirring and maintaining ice cooling, 18.2 g of water are carefully and slowly added. At the end of hydrolysis 9.68 g of epoxy resin D.E.R. 330 (Dow Corning Company) are stirred into the hydrolyzate.

For adjusting the lacquer characteristics it is possible to add at this time conventional lacquer additives and solvents (high boiling alcohols and glycol ethers).

The reaction solution can then be applied by conventional processes to different substrates. If the coating material is applied by the dipping process to silver plates cleaned in the ultrasonic bath (ethanol and isopropanol as solvents), after curing (2 hours at 160° C.) colourless, transparent coatings are obtained, which have a good adhesion and abrasion resistance and a good barrier action relative to $H_2S$.

EXAMPLE 3

17.8 g of phenyl trimethoxy silane, 138.3 g of 3-glycidyloxy propyl trimethoxy silane and 9.9 g of aminopropyl triethoxy silane are stirred under ice cooling. 44.33 g of aluminium sec. butylate are mixed with 23.4 g of ethyl acetoacetate and added to the reaction mixture. After adding 3 g and then 6 g of water stirring in each case takes place for 15 min, accompanied by ice cooling. After a further addition of 48.6 g of water stirring takes place for a further 2h at ambient temperature.

To the mixture are now added 26.79 g of epoxy resin and 0.54 g of a flow-control agent. The viscosity of the mixture is adjusted to approximately 10 mPa·s by conventional lacquer solvents.

Comparable coating results are obtained with the coating materials given in the table.

EXAMPLE 4

23.80 g of phenyl trimethoxy silane, 37.25 g of methacryloxypropyl trimethoxy silane and 7.39 g of aluminium sec. butylate are mixed together in a three-necked flask, accompanied by ice cooling. This is followed by the dropwise addition of 19.23 g of distilled water, which initially takes place very slowly (⅓ of the quantity within 15 min.) and then somewhat faster (remainder in approximately 5 min.). After stirring for 2h at ambient temperature, 0.16 g of a flow-control agent, 14.61 g of ethyl acetoacetate, 4 g of tetraacrylate and 2.8 g of a photoinitiator are successively added. This gives a clear, low viscosity solution. It is applied by a dipping process to a glass plate and is photochemically cured with thermal after-treatment (either 45 min./130° C. or by means of IR-radiation).

Coatings produced in this way are colourless, clear and highly transparent. They are characterized by high wiping and abrasion resistance, good chemical stability and a permanently good adhesion to the substrate, even after different weather exposure tests.

| Composition | Example 5 | Example 6 | Example 7 | Example 8 |
|---|---|---|---|---|
| Phenyl trimethoxy silane | 35.7 g | 11.9 g | — | — |
| Propyl trimethoxy silane | — | — | 28.6 g | 28.6 g |
| 3-glycidyloxypropyl trimethoxy silane | 297.8 g | 99.3 g | 127.5 g | 127.5 g |
| Aminopropyl triethoxy silane | — | — | 9.9 g | 9.9 g |
| Al(OBu$^S$)$_3$ | 88.7 g | 29.6 g | 33.3 g | 33.3 g |
| Complexing | 46.85[1] g | 15.6[1] | 23.4[1] | 23.4[1] |
| Water | 6 g/12 g/97 g | 2 g/4 g/32 g | 3 g/6 g/49 g | 3 g/6 g/49 g |
| Epoxy resin | 53.7 g[3] | 35.8[3] | 25.8 g[4] | 51.6 g[4] |
| Flow-control agent | 1.1 g | 0.4 g | 0.5 g | 0.5 g |

| Composition | Example 9 | Example 10 | Example 11 | Example 12 |
|---|---|---|---|---|
| Phenyl trimethoxy silane | 17.8 g | 53.5 g | 53.5 g | 5.9 g |
| Propyl trimethoxy silane | — | — | — | — |
| 3-glycidyloxyproply trimethoxy silane | 149.9 g | 95.7 g | 95.7 g | 46.1 g |
| Aminopropyl triethoxy silane | — | 9.9 g | — | 3.3 g |
| Al(OBu$^S$)$_3$ | 44.3 g | 44.3 g | 44.3 g | 14.8 g |
| Complexing | 18.0 g[2] | 23.4 g[1] | 23.4 g[1] | 7.8 g[1] |
| Water | 3 g/6 g/49 g | 3 g/6 g/49 g | 3 g/6 g/49 g | 1 g/2 g/16 g |
| Epoxy resin | 26.9 g[3] | 26 g[3] | 25 g[3] | 8.9 g[5] |
| Flow-control agent | 0.6 g | 0.6 g | 0.5 g | 0.2 g |

| Composition | Example 13 | Example 14 | Example 15 | Example 16 |
|---|---|---|---|---|
| Phenyl trimethoxy silane | 8.9 g | 26.8 g | 53.5 g | — |
| Propyl trimethoxy silane | — | — | — | — |
| 3-glycidyloxypropyl trimethoxy silane | 72.4 g | 50.3 g | 100.6 g | 170.1 g |
| Aminopropyl triethoxy silane | 3.3 g | 5.0 g | 10.0 g | — |
| Al(OBu$^S$)$_3$ | 22.2 g | 22.2 g | 44.3 g | 44.3 g |
| Complexing | 11.7 g[1] | 11.7 g[1] | 23.4 g[1] | 23.4 g[1] |
| Water | 1.5 g/3 g/24 g | 1.5 g/3 g/24 g | 3 g/6 g/49 g | 3 g/6 g/49 g |
| Epoxy resin | 13.6 g[6] | 14.5 g[6] | 28.9 g[4] | 21.4 g[3] |
| Flow-control agent | 0.3 g | 0.3 g | 0.6 g | 0.6 g |

[1] Ethyl acetonacetate
[2] Acetyl acetonate
[3] D.E.R. 330
[4] Araldyt GY 260
[5] Lekuterm 18 X
[6] D.E.R. 331

What is claimed is:

1. Process for the production of abrasion resistant functional coatings utilizing organofunctional silanes, a metal compound and difficultly volatile oxides, comprising the steps of:
    a) performing a hydrolytic condensation, optionally in the presence of a condensation catalyst and/or additives, of the following components 1) at least one crosslinkable, organofunctional silane of formula (II)

$$R'''_m SiX_{(4-m)} \quad (II)$$

in which the groups X, being the same or different, stand for hydrogen, halogen, alkoxy, acyloxy, alkylcarbonyl, alkoxycarbonyl or —NR''$_2$ (R''=H and/or alkyl) and the radicals R''', being the same or different, stand for alkyl, alkenyl, alkynyl, aryl, arylalkyl, alkylaryl, arylalkenyl, alkenylaryl, arylalkynyl or alkynylaryl, in which the R''' radicals are optionally interrupted by O or S-atoms or the group —NR'', the R''' radicals optionally carry one or more substituents from the group of halogens and optionally substituted amino, amide, aldehyde, keto, alkylcarbonyl, carboxy, mercapto, cyano, hydroxy, alkoxy, alkoxycarbonyl, sulphonic group, phosphoric group, acryloxy, methacryloxy, epoxy or vinyl groups and m has the value 1,2 or 3 and/or an oligomer derived therefrom, in which the radical R''' and/or the substituent is a crosslinkable radical or substituent, in a quantity of 10 to 95 mole %, based on the total number of moles of the monomeric starting component;

2) at least one metal compound of general formula III $$MeR_y \quad (III)$$

in which Me is a metal selected from Al, Zr, or Ti, in which y in the case of Al aluminium is 3 and zirconium and titanium is 4 and the radicals R, being the same or different, stand for halogen, alkyl, alkoxy, acyloxy or hydroxy, in which said groups are optionally wholly or partly replaced by chelating ligands or an oligomer derived therefrom or an optionally complexed metal salt of an inorganic or organic acid, in a quantity of 5 to 75 mole %, based on the total number of moles of the monomeric starting component;

3) optionally at least one non-crosslinkable organofunctional silane of formula I $$R'_m SiX_{(4-m)} \quad (I)$$

in which the groups X, being the same or different, stand for hydrogen, halogen, hydroxy, alkoxy, acyloxy, alkylcarbonyl, alkoxycarbonyl or —NR''$_2$ (R''=H and/or alkyl) and the radicals R', being the same or different, stand for alkyl, aryl, arylalkyl or alkylaryl, in which said R' radicals can be interrupted by O or S-atoms or the group —NR'', the R' radicals optionally carry one or more substituents from the group of halogens and optionally substituted amide, aldehyde, keto, alkylcarbonyl, carboxy, cyano, alkoxy or alkoxycarbonyl groups and m has the value 1,2 or 3 and/or an oligomer derived therefrom, in a quantity of 0 to 60 mole %, based on the total number of moles of the monomeric starting components; and 4) optionally one or more difficultly volatile oxides, soluble in the reaction medium, of an element of the main group Ia to Va or the auxiliary groups IIb, IIIb, Vb to VIIIb of the periodic system, with the exception of Al, and/or one or more compounds of one of these elements soluble in the reaction medium and forming a difficultly volatile oxide under the reaction conditions, in a quantity of 0 to 70 mole %, based on the total number of moles of the monomeric starting component;

b) adding to said hydrolytic condensate an organic, crosslinkable prepolymer, said crosslinkable prepolymer being completely an unblocked prepolymer, the reacting, crosslinkable groups of radical R''' or the crosslinkable substituent at the radical R''' being crosslinkable with identical reacting groups at the prepolymer and the prepolymer is added in a quantity of 2 to 70 mole %, based on the total number of moles of the monomeric starting component, thereby resulting in a coating solution; and c) applying and subsequently curing the coating solution on a substrate.

2. Process according to claim 1, characterized in that the metal compound of general formula III (component 2) is added in chelated form.

3. Production process according to claim 1, characterized in that in place of process stages a) and b), there is initially a hydrolytic precondensation with a smaller water quantity than is stoichiometrically necessary for the complete hydrolysis of the hydrolyzable groups, then the prepolymer is added and this is followed by further condensation by adding further water, which wholly or partly brings about the hydrolysis of the remaining hydrolyzable groups and optionally a condensation catalyst.

4. Process according to claim 1, characterized in that, based on the total number of moles of the starting components, 2 to 90 mole % component 1, 5 to 60 mole % of component 2, 0 to 50 mole % of component 3 and 0 to 40 mole % of component 4 are used.

5. Process according to claim 1, characterized in that the hydrolytic condensation or the further condensation takes place in the presence of an acid or basic condensation catalyst.

6. Process according to claim 3, characterized in that the water quantity used for precondensation is introduced by means of moisture-containing adsorbents, water-containing organic solvents, salt hydrates or water-forming systems.

7. Process according to claim 1, characterized in that the additives are chosen from organic thinners, flow-control agents, colouring agents, UV-stabilizers, fillers, viscosity regulators, lubricants, spreading agents, sedimentation inhibitors or oxidation inhibitors or mixtures thereof.

8. Process according to claim 1, characterized in that, prior to the application of the coating material, the substrate surface is treated with a primer, heated, leached out, precleaned by means of aqueous or organic media and/or exposed to an electric discharge.

9. Process according to claim 1, characterized in that the coating is hardened by heat treatment at a temperature up to 200° C., and/or by treatment with rays.

10. Process according to claim 1, characterized in that the hardened coating undergoes chemical and/or physical aftertreatment.

11. A coating material for producing coatings on substrates, characterized in that it is obtained by hydrolytic condensation, said coating material comprising:

1) at least one crosslinkable, organofunctional silane of formula (II)

$$R'''_m SiX_{(4-m)} \quad (II)$$

in which the groups X, which can be the same or different, stand for hydrogen, halogen, alkoxy, acyloxy, alkylcarbonyl, alkoxycarbonyl or —NR''$_2$ (R''=H and/or alkyl) and the radicals R''', which can be the same or different, stand for alkyl, alkenyl, alkynyl, aryl, arylalkyl, alkylaryl, arylalkenyl, alkenylaryl, arylalkynyl or alkynylaryl, in which the R''' radicals are optionally interrupted by O or S-atoms or the group —NR'', the R''' radicals optionally carry one or more substituents from the group of halogens and optionally substituted amino, amide, aldehyde, keto, alkylcarbonyl, carboxy, mercapto, cyano, hydroxy, alkoxy, alkoxycarbonyl, sulphonic group, phosphoric group, acryloxy, methacryloxy, epoxy or vinyl groups and m has the value 1,2 or 3 and/or an oligomer derived therefrom, in which the radical R''' and/or the substituent is a crosslinkable radical or substituent, in a quantity of 10 to 95 mole %, based on the total number of moles of the monomeric starting component;

2) at least one metal compound of general formula III $$MeR_y \quad (III)$$

in which Me is a metal selected from Al, Zr, or Ti, in which y in the case of Al aluminium is 3 and zirconium and titanium is 4 and the radicals R, being the same or different, stand for halogen, alkyl, alkoxy, acyloxy or hydroxy, in which said groups are optionally wholly or partly replaced by chelating ligands or an oligomer derived therefrom or an optionally complexed metal salt of an inorganic or organic acid, in a quantity of 5 to 75 mole %, based on the total number of moles of the monomeric starting component;

3) optionally at least one non-crosslinkable organofunctional silane of formula I

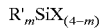  (I)

in which the groups X, being the same or different, stand for hydrogen, halogen, hydroxy, alkoxy, acyloxy, alkylcarbonyl, alkoxycarbonyl or —NR"$_2$ (R"=H and/or alkyl) and the radicals R', being the same or different, stand for alkyl, aryl, arylalkyl or alkylaryl, in which said R' radicals are optionally interrupted by O or S-atoms or the group —NR", the R' radicals optionally carry one or more substituents from the group of halogens and optionally substituted amide, aldehyde, keto, alkylcarbonyl, carboxy, cyano, alkoxy or alkoxycarbonyl groups and m has the value 1,2 or 3 and/or an oligomer derived therefrom, in a quantity of 0 to 60 mole %, based on the total number of moles of the monomeric starting components; and 4) optionally one or more difficultly volatile oxides, soluble in the reaction medium, of an element of the main group Ia to Va or the auxiliary groups IIb, IIIb, Vb to VIIIb of the periodic system, with the exception of Al, and/or one or more compounds of one of these elements soluble in the reaction medium and forming a difficultly volatile oxide under the reaction conditions, in a quantity of 0 to 70 mole %, based on the total number of moles of the monomeric starting component;

5) adding to said hydrolytic condensate an organic crosslinkable prepolymer, said crosslinkable prepolymer being completely an unblocked prepolymer, the reacting, crosslinkable groups of the radical R''' or the crosslinkable substituent at the radical R''' being crosslinkable with identical reacting groups at the prepolymer and the prepolymer is added in a quantity of 2 to 70 mole %, based on the total number of moles of the monomeric starting component, thereby resulting in a coating solution.

12. A coating material according to claim 11, characterized in that the metal compound of general formula III (component 2) is added in chelated form.

13. A coating material according to claim 12, characterized in that for producing the hydrolytic condensate, firstly there is a hydrolytic precondensation of components 1 to 4 with a smaller water quantity than is stoichiometrically necessary for the complete hydrolysis of the hydrolyzable groups, the prepolymer is then added, followed by further condensation by adding further water, which brings about the partial or complete hydrolysis of the remaining hydrolyzable groups, as well as optionally a condensation catalyst.

14. A scratch-proof coated substrate prepared by a process comprising the steps of:

a) performing a hydrolytic condensation, optionally in the presence of a condensation catalyst and/or additives, of the following components:

1) at least one crosslinkable, organofunctional silane of formula (II)

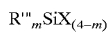  (II)

in which the groups X, being the same or different, stand for hydrogen, halogen, alkoxy, acyloxy, alkylcarbonyl, alkoxycarbonyl or —NR"$_2$ (R"=H and/or alkyl) and the radicals R''', being same or different, stand for alkyl, alkenyl, alkynyl, aryl, arylalkyl, alkylaryl, aryl-alkenyl, alkenylaryl, arylalkynyl or alkynylaryl, in which the R''' radicals can be interrupted by O or S-atoms or the group —NR", the R''' radicals optionally carry one or more substituents from the group of halogens and optionally substituted amino, amide, aldehyde, keto, alkylcarbonyl, carboxy, mercapto, cyano, hydroxy, alkoxy, alkoxycarbonyl, sulphonic group, phosphoric group, acryloxy, methacryloxy, epoxy or vinyl groups and m has the value 1,2 or 3 and/or an oligomer derived therefrom, in which the radical R''' and/or the substituent is a crosslinkable radical or substituent in a quantity of 10 to 95 mole %, based on the total number of moles of the monomeric starting component;

2) at least one metal compound of general formula III

  (III)

in which Me is a metal selected from Al, Zr, or Ti, in which y in the case of Al aluminum is 3 and zirconium and titanium is 4 and the radicals R, being the same or different, stand for halogen, alkyl, alkoxy, acyloxy or hydroxy, in which said groups can be wholly or partly replaced by chelating ligands or oligomer derived therefrom or an optionally complexed metal salt of an inorganic or organic acid, in a quantity of 5 to 75 mole %, based on the total number of moles of the monomeric starting component;

3) optionally at least one non-crosslinkable organofunctional silane of formula I

  (I)

in which the groups X, being the same or different, stand for hydrogen, halogen, hydroxy, alkoxy, acyloxy, alkylcarbonyl, alkoxycarbonyl or —NR"$_2$ (R"=H and/or alkyl) and the radicals R', being the same or different, stand for alkyl, aryl, arylalkyl or alkylaryl, in which said R' radicals can be interrupted by O or S-atoms or the group —NR", the R' radicals optionally carry one or more substituents from the group of halogens and optionally substituted amide, aldehyde, keto, alkylcarbonyl, carboxy, cyano, alkoxy or alkoxycarbonyl groups and m has the value 1,2 or 3 and/or an oligomer derived therefrom, in a quantity of 0 to 60 mole %, based on the total number of moles of the monomeric starting components; and 4) optionally one or more difficulty volatile oxides, soluble in the reaction medium, of an element of the main group Ia to Va or the auxiliary groups IIb, IIIb, Vb to VIIIb of the periodic system, with the exception of Al, and/or one or more compounds of one of these element soluble in the reaction medium and forming a difficultly volatile oxide under the reaction conditions, in a quantity of 0 to 70 mole %, based on the total number of moles of the monomeric starting component;

b) adding to said hydrolytic condensate an organic, crosslinkable prepolymer, said crosslinkable prepolymer being completely an unblocked prepolymer, the reacting, crosslinkable groups of radical R''' or the crosslinkable substituent at the radical R''' being crosslinkable with identical reacting groups at the prepolymer and the prepolymer is added in a quantity of 2 to 70 mole %, based on the total number of moles of the monomeric starting component, thereby resulting in a coating solution; and c) applying and subsequently curing the coating solution on a substrate.

15. A coating material according to claim 12, further comprises additives chosen from organic thinners, flow-control agents, coloring agents, UV-stabilizers, fillers, viscosity regulators, lubricants, spreading agents, sedimentation inhibitors or oxidation inhibitors or mixtures thereof.

16. A coating material according to claim 12 further comprises a condensation catalyst selected form an acid or a basic condensation catalyst.

17. A coating material according to claim 12, characterized in that the viscosity is adjusted to 5 to 50 mPa·s.

18. Process according to claim 1 characterized in that the coating is hardened by heat treatment at a temperature in the range of about 60 to 160° C., and/or treatment with rays.

19. Process according to claim 1, characterized in that, based on the total number of moles of the starting components, 30 to 90 mole % of component 1, 10 to 40 mole % of component 2, 0 to 40 mole % of component 3 and 0 to 40 mole % of component 4 are used.

* * * * *